United States Patent [19]

Swanson

[11] Patent Number: 4,939,503
[45] Date of Patent: Jul. 3, 1990

[54] TOWED VEHICLE ELECTRICAL SYSTEM WIRING DEVICE

[76] Inventor: Carl S. Swanson, P.O. Box 4251, Brownsville, Tex. 78523

[21] Appl. No.: 337,209

[22] Filed: Apr. 12, 1989

[51] Int. Cl.$^5$ .............................................. B60Q 1/46
[52] U.S. Cl. .................................. 340/468; 307/10.8; 315/77; 340/431
[58] Field of Search ............... 340/431, 468, 472, 475; 307/10.8; 315/77; 361/111; 439/35, 503

[56] References Cited

U.S. PATENT DOCUMENTS

| | | | |
|---|---|---|---|
| 3,585,453 | 6/1971 | Kawai | 315/77 |
| 3,849,664 | 11/1974 | Bryant | 315/77 |
| 4,006,453 | 2/1977 | Bryant | 340/431 |
| 4,013,996 | 3/1977 | Hubbard | 340/463 |
| 4,270,115 | 5/1981 | Bonnett | 340/431 |
| 4,670,736 | 6/1987 | Ulrich | 340/468 |

OTHER PUBLICATIONS

"Tips for Wiring Tow Car Lights-Family Motor Coaching", Mar. 1989.
"Wiring Today's Car Lights for Towing-Family Motor Coaching", Mar. 1989.

Primary Examiner—Joseph A. Orsino
Assistant Examiner—Brent A. Swarthout
Attorney, Agent, or Firm—Diller, Ramik & Wight

[57] ABSTRACT

The control circuit of a towing vehicle is coupled to the signal lights of a towed vehicle to allow the signal lights of the towed vehicle to be controlled by the towing vehicle. The coupling itself is conveniently located and readily made or broken. A signal blocking circuit prevents signals from the towing vehicle from affecting control circuitry in the towed vehicle.

2 Claims, 1 Drawing Sheet

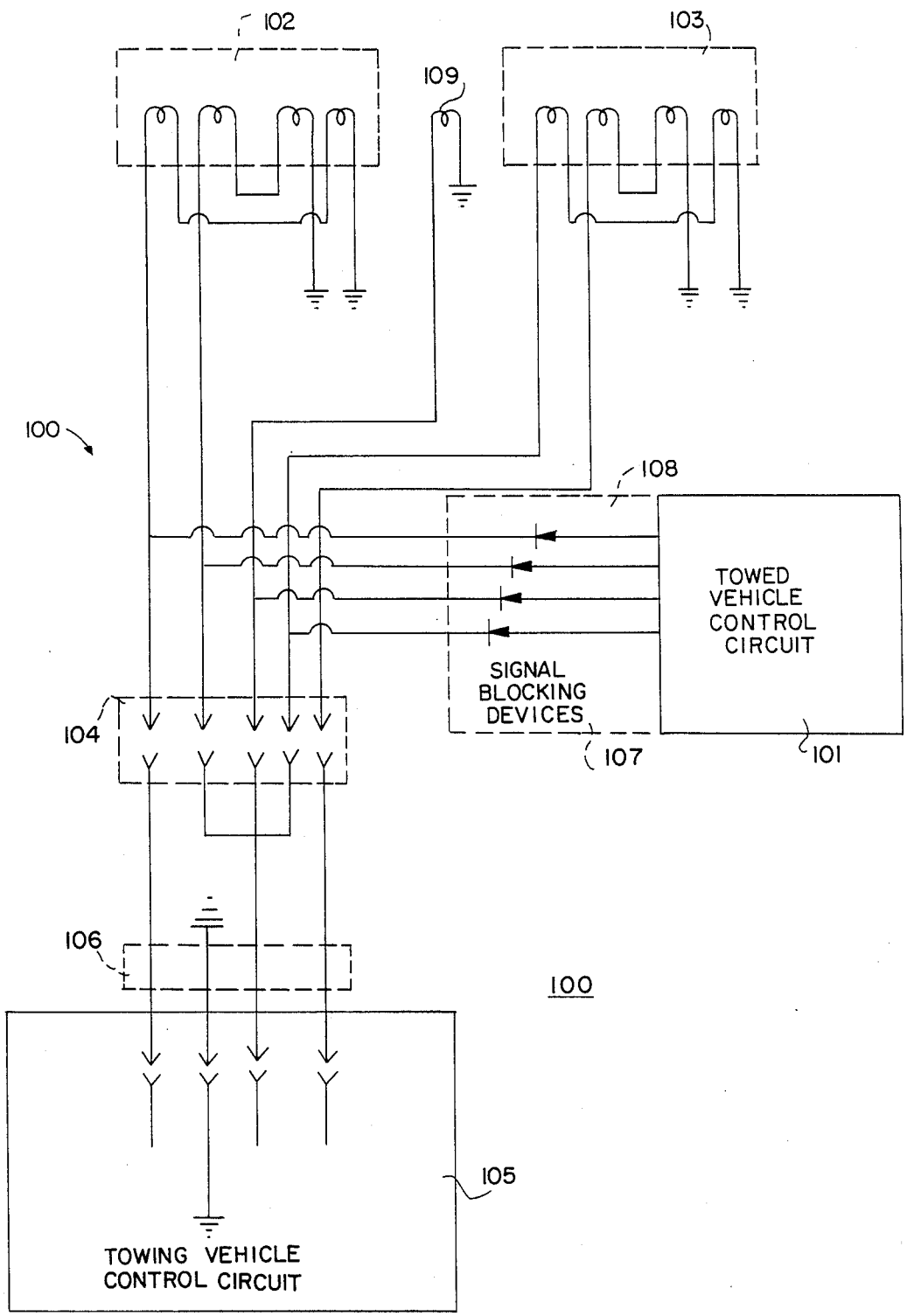

TOWED VEHICLE ELECTRICAL SYSTEM WIRING DEVICE

TECHNICAL FIELD

This invention relates generally to wiring harnesses as used with towed vehicles, and more particularly to protection circuitry for electrical components used in the towed vehicle.

BACKGROUND ART

Vehicles such as automobiles generally include their own locomotion capability. This locomotion capability in modern vehicles often includes an internal combustion engine and an appropriate control mechanism. The control mechanism will often include a microprocessor or microcomputer. In fact, many automobiles now include a plurality of microprocessors to enable optimum and efficient control of a variety of vehicle functions. These microprocessors receive input signals and provide control signals through conductors that are properly disposed throughout the vehicle.

From time to time, it becomes desirable or necessary to tow such a vehicle. In this mode, a towing vehicle provides the locomotion and the towed vehicle moves in passive conjunction therewith. Since the towed vehicle will usually occlude the tail mounted signal lights (such as brake lights and turn signal indicators) of the towing vehicle (as viewed from behind), provision must be made to ensure that appropriate signal lights are provided at the rear of the towed vehicle.

Pursuant to one prior art approach, signal lights can be electrically connected to the appropriate control lines of the towing vehicle and then temporarily connected to the exterior of the towed vehicle. This approach involves significant cost for the exterior mounted lights, inconvenience, and risk to the exterior finish of the towed vehicle.

Pursuant to another prior art approach, the signal lights of the towed vehicle itself are electrically connected to the appropriate control lines of the towing vehicle, such that the signals lights of the towed vehicle switch on and off in direct response to the control signals of the towing vehicle. Though avoiding many of the problems of the earlier prior art approach noted above, this solution does give rise to other problems as well.

For example, intercoupling the control lines of the towing vehicle with the control lines of the towed vehicle can be tedious and time consuming, partiuclarly if the operator needs to make and break this coupling on a repeated basis. Also, the control signals initiated by the towing vehicle (or other signals present on the control lines, such as voltage or current spikes) may damage the electronic control devices (such as microprocessors) of the towed vehicle.

A need therefor exists for a towed vehicle electrical system wiring device that will allow relatively rapid and conveneient coupling to be effected between a towed vehicle and a towing vehicle on a repetitive basis. This device should also preferably additionally function to protect the electronic control devices of the towed vehicles.

SUMMARY OF THE INVENTION

These needs and others are substantially met through provision of the towed vehicle electrical system wiring device that is decribed herein. This device includes generally two inputs. One input is for coupling to the control line output ports of the electronic control devices of the towed vehicle. The remaining input is for temporarily coupling to the control line output ports of the electronic control devices of a towing vehicle. The device also includes an output that couples to the rear signal lights (such as the brake lights and turn signal lights) of the towed vehicle.

In one embodiment, signal blocking devices are included to prevent control signals (or any other signals) provided by the towing vehicle from being presented to the control devices of the towed vehicle. Instead, the control signals from the towing vehicle are only allowed access to the signal lights of the towed vehicle, thereby protecting the control devices of the towed vehicle.

In another embodiment, the temporary coupling between the control signal inputs from the towing vehicle and the second input of the device can be conveniently located in the cabin of the towed vehicle. Such convenient location allows relatively rapid access to the coupling by the operator, and thereby allows the towed vehicle to be readied for towing in a relatively simple manner.

BIREF DESCRIPTION OF THE DRAWINGS

These and other attributes of the invention will become more clear upon making a thorough review and study of the following description of the preferred embodiment, particularly when reviewed in conjunction with the drawing, wherein;

FIG. 1 comprises a schematic diagram of the invention.

DESCRIPTION OF THE PREFERRED EMBODIMENT

Referring now to the drawing, the invention can be seen in FIG. 1 as generally depicted by the numberal 100. The invention operates in conjunction with the control circuit (101) of the towed vehicle and the rear signal lights (102 and 103). In particular, the control circuit (101) provides control signals in a known manner to the rear right-side brake and turn signal lights (102), the rear left-side brake and turn signal lights (103), and the rear license plate light (109). (The precise coupling between the control circuit and signal lights will vary, of course, from vehicle to vehicle in accordance with the particular control scheme used; for example, some vehicles use only a single light on the left side and a single light on the right side and do not provide separate brake and turn signal lights. The teachings of this invention are equally applicable to such alternatively configured vehicles.)

This coupling between the towed vehicle control circuit (101) and the rear signal lights (102 and 103) comprises a permanent coupling in this embodiment, although in an appropriate embodiment the coupling could be made temporary if desired, as through use of a plug.

The invention also includes a plug (104) that allows the control lines to the signal lights to be coupled to the control circuit of a towing vehicle (105). In this embodiment, a breakable coupling is used to allow the connection to be readily made or broken. Preferably, the breakable coupling is conveniently located; for example, the coupling may be affixed, through the use of Velcro, inside the passenger cabin of the towed vehicle, underneath the glove box. So positioned, the coupling can be easily accessed to allow the coupling to be made or broken.

If desired, a second coupling (106) can also be used. This second coupling may be conveniently located on the exterior of the towed vehicle. This allows the control lines from the towing vehicle to be readily connected to the towed vehicle.

This embodiment also includes signal blocking devices (107). In particular, a diode (108) can be serially coupled with each control line from the towed vehicle control circuit (101). So configured, control signals from the towed vehicle control circuit (101) pass unobstructed to the signal lights (102 and 103). Control signals from the towing vehicle control circuit (105), however, are prevented from entering the towed vehicle control circuit (101). In this way, the delicate and sensitive components of the towed vehicle control circuit (101) are protected from both the control signals provided by the towing vehicle control circuit (105) and other potentially harmful signals that may appear on the control lines.

The value of the diodes (108) is selected to accomodate expected signal levels. For example, control signals intended for the turn signals and the license plate light may require use of a 1 ampere diode, whereas control signals intended for use with the brake lights may require use of a 3 ampere diode.

A vehicle equipped with this invention can be readily configured for towing with a minimum of time and effort required. Further, a vehicle so equipped will allow the control signals provided by the towing vehicle to control the rear signal lights of the towed vehicle, while simultaneously protecting the control circuitry of the towed vehicle from the signals provided by the towing vehicle.

Those skilled in the art will appreciate that various modifications can be made to the described device without departing from the spirit and scope of the invention.

I claim:

1. A wiring and protection device for use between:
   a towed vehicle having signal lights and first control means for providing control signals to said signal lights; and
   a towing vehicle having second control means for providing control signals;
   said wiring and protection device comprising:
   (A) signal blocking means coupled to said first control means for simultaneously allowing control signals to be received therefrom and for preventing other signals from being provided thereto;
   (B) output means for substantially permanently coupling to said signal lights;
   (C) first input means for substantially permanently coupling to said output means and to said signal blocking means to allow provision of said control signals as provided by said first control means to said signal lights;
   (D) second input means for substantially temporarily coupling said output means to said second control means to allow provision of said control signals as provided by said second control means to said signal lights;
   such that control signals from either said first control means or said second control means are provided to said signal lights to control said signal lights, and signals provided by said second control means are prevented from influencing said first control means.

2. The wiring and protection device of claim 1, wherein said signal blocking means includes a plurality of diodes coupled to said first control means.

* * * * *